P. FABROWICZ.
TROLLEY HARP.
APPLICATION FILED SEPT. 5, 1911.
1,019,619.
Patented Mar. 5, 1912.
2 SHEETS—SHEET 1.
Fig. 1.
Fig. 2.
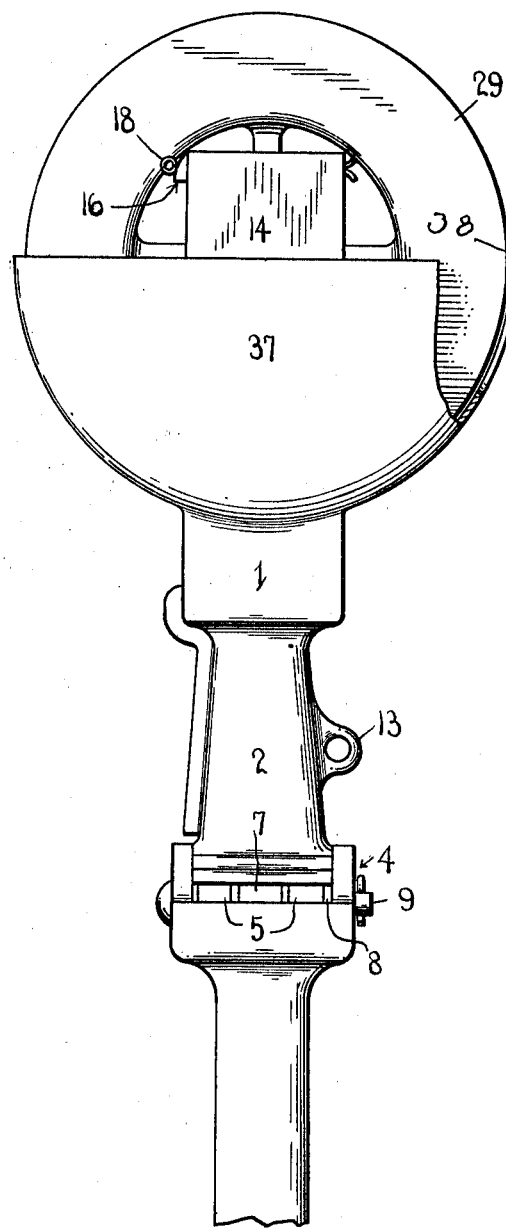
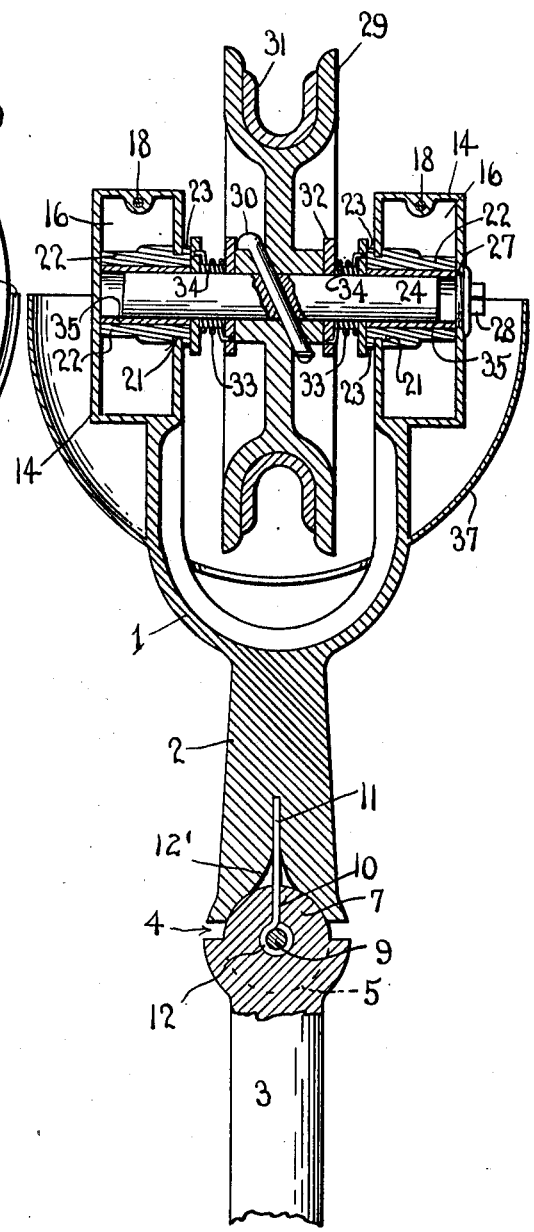
Witnesses
L. B. James
C. E. Hunt
Inventor
Peter Fabrowicz
by H. B. Willson & Co.
Attorneys

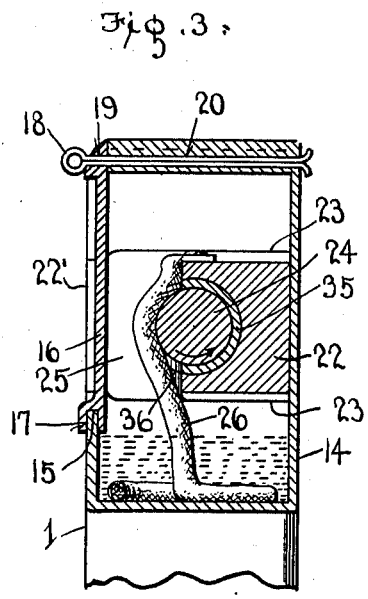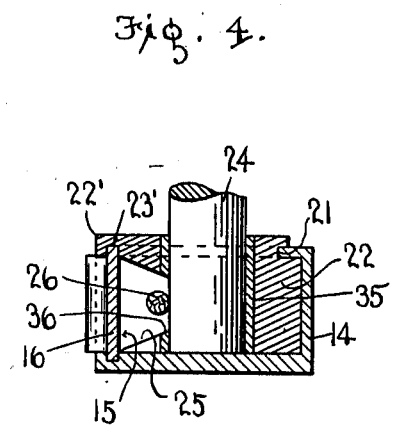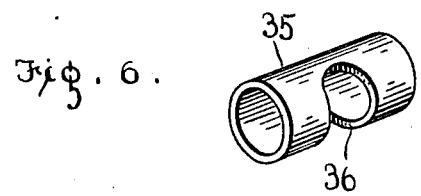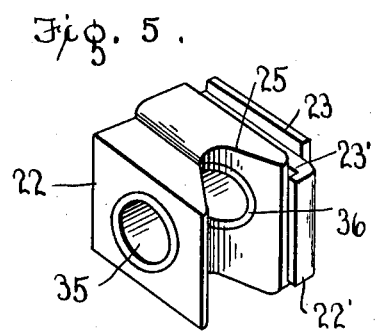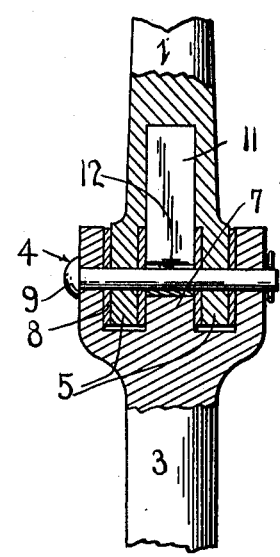

UNITED STATES PATENT OFFICE.

PETER FABROWICZ, OF SCRANTON, PENNSYLVANIA.

TROLLEY-HARP.

1,019,619.  Specification of Letters Patent.  Patented Mar. 5, 1912.

Application filed September 5, 1911.  Serial No. 647,619.

*To all whom it may concern:*

Be it known that I, PETER FABROWICZ, a citizen of the United States, residing at Scranton, in the county of Lackawanna and State of Pennsylvania, have invented certain new and useful Improvements in Trolley-Harps; and I do declare the following to be a full, clear, and exact description of the invention, such as will enable others skilled in the art to which it appertains to make and use the same.

This invention relates to improvements in trolley harps.

One object of the invention is to provide a trolley harp having an improved construction and arrangement of self oiling mechanism whereby the journals of the wheels are kept properly lubricated.

Another object is to provide a trolley harp having an improved means for protecting the flanges of the trolley wheel should the latter leave the wire when passing beneath bridges or other objects into which the wheel would come into contact.

With these and other objects in view, the invention consists of certain novel features of construction, and the combination and arrangement of parts as will be more fully described and claimed.

In the accompanying drawings: Figure 1 is a side view of a trolley harp constructed in accordance with my invention and showing the same equipped with a trolley wheel; Fig. 2 is a central vertical cross sectional view of the same; Fig. 3 is an enlarged sectional view through one of the oil boxes or chambers on the upper ends of the trolley fork; Fig. 4 is a horizontal sectional view of the same. Fig. 5 is a detail perspective view of one of the journal boxes for the trolley wheel shaft; Fig. 6 is a similar view of one of the bearing sleeves of the trolley wheel shaft; Fig. 7 is a detail vertical sectional view through the yielding connection of the trolley forks and upper end of the trolley pole.

Referring more particularly to the drawings, 1 denotes my improved trolley fork which comprises a shank 2 hingedly connected to the upper end of the trolley pole 3 by a knuckle joint 4 comprising a series of substantially cylindrical lugs 5 formed on the lower end of the shank 2 and which are adapted to engage a series of semi-circular pole lugs 7 arranged on the upper end of the trolley pole as shown. Between the lugs 5 and 7 are arranged wear plates or washers 8 and through said lugs and washers is arranged a pivot pin 9 said pin being preferably held in position by a cotter pin 60 or other suitable fastening means as shown.

In the intermediate lug on the end of the trolley pole is formed a notch 10 in which is arranged the lower end of a flat spring 11 in the lower end of which is formed an 65 eye 12 through which is inserted the pivot pin 9 of the joint. The upper end of the spring projects into a recess 12' formed in the shank of the trolley frame. When thus arranged the spring 11 will yieldingly hold 70 the harp in proper position but will permit the same to swing laterally in either direction when the car is passing around curves thus preventing the sides of the wheel from binding against the wire or being forced out 75 of engagement therewith. On one side of the shank 2 of the fork is formed an apertured lug 13 to which is adapted to be connected the controlling rope of the trolley pole and harp. 80

On the upper ends of the forks are formed oil boxes or chambers 14, said oil boxes being preferably offset or projecting beyond the outer sides of the upper ends of the fork and in one edge of each of the boxes 85 14 is formed a filling opening 15 through which the oil and wicks are applied to the bearings of the trolley wheel. The openings 15 are closed by oil tight doors 16 which are slidably engaged with guide grooves 90 formed in the edges of the openings. The doors 16 have formed in their lower edges deep grooves or notches 17 which, when the doors are closed engage and fit over the lower edges of the openings and thus form 95 an oil tight closure. The doors 16 are held in closed fluid tight position by cotter pins 18 or similar fastening devices which are inserted through alined apertures 19 and 20 in the doors and top of the boxes 14 as 100 shown.

In the inner sides of the boxes on the upper ends of the fork are formed rectangular openings 21 with which are engaged rectangular journal boxes 22 having on their outer 105 ends outwardly projecting stop flanges 23 which form guide grooves on the upper and lower sides of the boxes, said grooves having a sliding engagement with the upper and lower edges of the openings 21, thus holding 110 the boxes in place. It will be noted that the sides of the boxes 22 adjacent to the open end of the openings 21 have formed thereon extensions 22' which when the boxes are in place fill the ends of the openings 21 as shown. In the inner side of the extensions 22' are formed guide grooves 23' which when the journal boxes are in place, form a continuation of one of the guide grooves in the edges of the openings 15 of the oil boxes and are adapted to receive the edges of the doors 16 which close said opening. The doors, when thus engaged in the guide grooves 23' and with the grooves in the edges of the openings 15, will securely hold the journal boxes in operative position in their openings 21 of the oil boxes. By thus arranging and fastening the rectangular journal boxes 22 it will be readily seen that in order to remove said boxes and the trolley wheel and shaft journaled therein it is simply necessary to remove the doors 16 and slide the boxes out through the open ends of the openings 21 in the sides of the oil boxes.

Through the center of the journal boxes are formed bearing passages or cylindrical bores, adapted to receive and revolubly support the ends of the trolley wheel shaft 24. In one side of each of the boxes 22 is formed a notch or recess 25 which intersects the bore or bearing aperture of the box, said recesses or notches 25 being adapted to receive wicks 26 the upper ends of which are secured to the top of the boxes as clearly shown in Fig. 3 of the drawing. The lower ends of the wick when thus arranged rest on the bottom of the oil chambers, while that portion lying in the notches 25 engages the adjacent sides of the shaft 24 of the trolley wheel, thus keeping said shaft thoroughly lubricated. In the outer side of one of the boxes 14 and in line with the bore of the journal box therein is formed a threaded passage 27 through which the shaft is adapted to be inserted when engaged with the journal boxes and trolley wheel. The passage 27 is normally closed by a screw plug 28 or other suitable form of closure.

Adapted to be engaged with and revolubly supported by the shaft 24 is a trolley wheel 29 the hub of which is preferably secured to the shaft 24 by a diagonally arranged wheel fastening pin 30 arranged through the hub of the wheel and through the shaft as shown. The wheel is provided with a grooved rim in which is preferably arranged a wear plate 31 to protect the inside of the flanges of the wheel. On the shaft 24 between the ends of the hub of the wheel and the flanged ends of the journal boxes are arranged washers 32 between which are disposed coiled springs 33. The pressure of the springs 33 upon the washers engaging the opposite sides of the wheel hub tend to yieldingly hold the wheel in the center of the shaft or midway between the ends of the forks. In addition to the springs 33 are also employed elastic spacing sleeves 34 which are arranged on the shaft between the pairs of washers 32 and within the springs 33 as shown. In the journal boxes 22 are preferably arranged bearing sleeves 35 in which the ends of the shaft 24 are engaged, said bearing sleeves being retained in position in the journal boxes by the springs 33. In one side of the sleeves 35 are formed apertures 36 which register with the apertures formed by the notches 35 in the sides of the box to permit the wick to be engaged with the sides of the shaft.

Arranged on and secured to the upper portion of the fork is a substantially hemispherical hollow casing 37 having its sides extending upwardly to a point practically in line with the center of the shaft of the wheel and in the upper edges of the casing opposite the grooved rim of the wheel are formed notches 38 which prevent the casing from interfering with the trolley wire. The casing 37 is arranged around the lower portion of the trolley wheel for the purpose of protecting the flanges of the latter in drawing it down when it has become disengaged from the trolley wire and thrown upward.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A trolley harp having on its upper ends, oil boxes, said boxes having in one side journal box receiving apertures, journal boxes arranged in said apertures and projecting into said oil boxes, said journal boxes having formed in one side wick receiving notches, said notches intersecting the bores of the journal boxes, bearing sleeves arranged in said journal boxes, said sleeves having formed therein apertures adapted to register with the apertures in said journal boxes, a trolley wheel shaft having its ends revolubly engaged with said journal boxes, wicks arranged in said oil boxes and passing through the notches of said journal boxes whereby the oil from the oil boxes is applied to the sides of the axle, a trolley wheel fixedly mounted on said shaft, and means arranged on the fork to protect the flanges of said wheel during replacement on the wire.

2. A trolley harp having on its upper ends, oil boxes, said boxes having in one side journal box receiving apertures, one of said boxes having in its opposite side a shaft receiving aperture, means to normally close said aperture, journal boxes adapted to be engaged with said journal box apertures, retaining flanges formed on the outer ends of said boxes whereby the latter are held in place, means whereby the oil in said oil boxes is applied to the journal boxes, a trolley wheel shaft having its ends revolubly mounted in said boxes, a trolley wheel fixedly mounted on said shaft, and a wheel protecting casing arranged on said fork and adapted to inclose the lower portion of the wheel whereby the flanges thereof are protected from breakage when being replaced after jumping the wire.

3. A trolley harp having on its upper ends, oil boxes, said boxes having in their inner sides, journal box receiving apertures and in one edge filling and wick receiving apertures, doors slidably engaged with said apertures, said doors having recessed lower edges adapted to engage the lower edges of the apertures whereby an oil tight connection is formed between these parts, means to fasten the doors in closed position, journal boxes arranged in the journal box apertures of said oil boxes, bearing sleeves arranged in said boxes, a trolley wheel shaft having its ends engaged with said bearing sleeves, a trolley wheel fixedly mounted on said shaft, and a wheel protecting casing arranged on the harp around the inner portion of the wheel whereby the wheel is protected in replacing the trolley on the wire.

4. A trolley harp comprising a shank, a forked body, oil boxes formed on the upper ends of said body, said boxes having formed in their inner sides, journal box receiving apertures, and in one of their outer edges filling openings, sliding doors adapted to form fluid tight closures for said filling openings, means to secure said doors in closed position, journal boxes adapted to be engaged with the journal box openings in the inner sides of the oil box, said journal boxes having circular bores and having in one side notches intersecting said bores, retaining flanges formed on one end of said boxes, a trolley wheel shaft having its ends revolubly and slidably engaged with said journal boxes, wicks secured to said journal boxes and adapted to engage the notches therein whereby the lubricant from the oil box is conveyed to the sides of the trolley wheel shaft, a trolley wheel fixedly mounted on said shaft, and means whereby the wheel is yieldingly held in position midway between the sides of the ends of the trolley fork.

5. A trolley harp comprising a shank having forked upper ends, oil boxes formed on the forked upper ends of the harp, said boxes having on their inner sides journal box apertures, journal boxes adapted to be engaged with said openings and projecting into said oil boxes, said journal boxes having formed in one side notches, said notches intersecting the bore of the boxes, a trolley wheel shaft having its ends revolubly mounted in said boxes, wicks secured in the notches of said journal boxes and adapted to engage and convey the lubricant from the oil boxes to the ends of said trolley wheel shaft whereby the latter are lubricated, and a trolley wheel fixedly secured to said shaft.

6. A trolley harp having an oil box on the upper end of each fork, having a journal box receiving opening in its inner sides, and a filling opening in its front face, a journal box slidable through the receiving opening from the front of the oil box, the edge of the journal box being grooved to embrace the edge walls of the receiving opening, grooves being also formed in one wall of the filling opening and in the inner face of the outer edge of the inserted journal box, and a door slidable in the two last named grooves closing the filling opening.

In testimony whereof I have hereunto set my hand in presence of two subscribing witnesses.

PETER FABROWICZ.

Witnesses:
FREDERICK MARWICK,
STANLEY SYMANSKI.

---

Copies of this patent may be obtained for five cents each, by addressing the "Commissioner of Patents, Washington, D. C."